United States Patent

[11] 3,614,570

[72] Inventor Louis F. Mayle
 Fort Wayne, Ind.
[21] Appl. No. 742,273
[22] Filed July 3, 1968
[45] Patented Oct. 19, 1971
[73] Assignee The Magnavox Company
 Fort Wayne, Ind.

[54] SIMPLIFIED WIRE REMOTE CONTROL OF SMALL MOTORS
 4 Claims, 4 Drawing Figs.
[52] U.S. Cl. .................................................. 318/486,
 323/156, 336/133
[51] Int. Cl. ...................................................... H02p 7/64
[50] Field of Search............................................ 318/486;
 323/50, 51, 85, 90, 156 T; 336/133

[56] References Cited
 UNITED STATES PATENTS
2,133,919 10/1938 Fries.............................. 336/133
2,110,313 3/1938 Warrick ........................ 317/156
3,280,375 10/1966 Jensen........................... 323/90
3,381,198 4/1968 Kawabe........................ 323/85
3,443,180 5/1969 Hirsch........................... 318/486

Primary Examiner—Benjamin Dobeck
Attorney—Richard T. Seeger

ABSTRACT: An electric circuit arrangement wherein a load current at a higher voltage can be remotely controlled by a control current at a lower voltage in which the load current passes through a first coil which is magnetically coupled to a second coil in which the control current flows. The magnetic coupling of the coils causes the impedance between the terminals of the second coil to be reflected back to the first coil. When a high impedance is across the terminals of the second coil, a small current, less than that required to activate the load, flows in the first coil whereas upon reduction of the impedance across the terminals of the second coil, the current flowing in the first coil rises to load actuating value. The variable impedance across the terminals of the second coil is, advantageously, a switch which is open for the high impedance condition and which is closed for the low impedance condition.

PATENTED OCT 19 1971

3,614,570

INVENTOR.
LOUIS F. MAYLE

BY JEFFERS & YOUNG
Attorneys

SIMPLIFIED WIRE REMOTE CONTROL OF SMALL MOTORS

This invention relates to an electric control system and, in particular, to an electric control system in which a load current at a higher voltage can be remotely controlled by a control current at a lower voltage.

There are many instances in which low voltage control circuits are employed for controlling higher voltage load circuits. Usually, the control circuit and load circuit are joined by a relay under the control of the control circuit while the relay, in turn, controls the load circuit. A number of relatively expensive components are required in such a circuit arrangement and, in addition, the relay has contacts which will deteriorate in time. Further, a source of control voltage is required which is ordinarily derived from still another circuit component in the form of a transformer.

Circuits of the nature referred to above are employed in a great many place. Lights are sometimes controlled by circuits of this nature. Electrically operated hospital beds and similar devices also employ such circuits. Television-tuning arrangements in institutions, such as hospitals, employ a low voltage control circuit with a pushbutton and a relay switch, in turn, controls a tuning motor that operates at line voltage. Other arrangements wherein, for reasons of safety or convenience, lower voltage control circuits control higher voltage load circuits will suggest themselves to those skilled in the art.

Having the foregoing in mind, the present invention has, as a particular object, the provision of an electric circuit arrangement having a higher voltage load circuit and a lower voltage control circuit in which the disadvantages encountered in prior art circuits referred to above are eliminated.

Another object is the provision of a circuit arrangement of the nature referred to which utilizes fewer components than prior art circuits and which is more inexpensive than prior art circuits.

It is also an object of the present invention to provide an electric circuit arrangement for actuating a load wherein remote control of the actuation of the load can be had by a lower voltage control circuit which is coupled magnetically to the load circuit.

Still another object is the provision of a control circuit magnetically coupled to a load circuit for remote low voltage control of the load circuit in which the voltage in the control circuit is utilized for auxiliary purposes when the load circuit is not being subjected to a control influence.

The foregoing object of the present invention, as well as other objects and advantages thereof will become more apparent upon reference to the following detailed specification, taken in connection with the accompanying drawings, in which.

Figure 1:
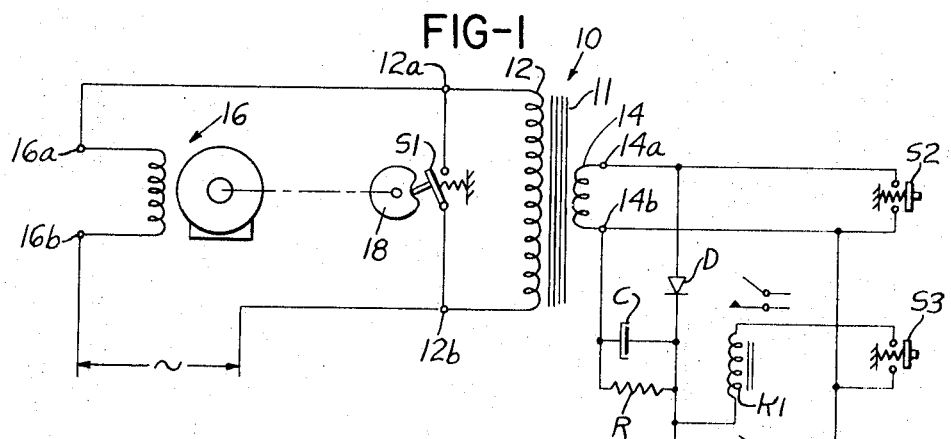
FIG. 1 is a schematic diagram showing one arrangement of a circuit according to the present invention.

In the drawings, in FIG. 1, 10 designates a transformer having a magnetic frame 11 on which a first, primary coil 12 and a second, secondary coil 14 are mounted in magnetically coupled relation. Coil 12 has a greater number of turns than coil 14 so the voltage across the terminals 14a and 14b of coil 14 is less than the voltage across terminals 12a and 12b of coil 12.

The one terminal, 12a, of coil 12 is connected to terminal 16a of electric motor 16, while terminal 12b is connected to one side of a source alternating current at a predetermined voltage, say, 120 volts. The other terminal 16b of motor 16 is connected to the other side of the source whereby the motor is in series with coil 12 and the load current that actuates the motor passes through coil 12.

A switch S1, which is normally open, is connected in parallel to coil 12 and is arranged to be closed by cam 18, driven by motor 16, when motor 16 commences to turn from its FIG. 1 position. When motor 16 makes one complete revolution, switch S1 will again drop open.

A second normally open switch S2 is connected across the terminals of coil 14. When switch S2 is open, maximum impedance stands across the terminals of coil 14 and, in conformity with the well known laws of operation for transformers, this impedance is reflected to primary coil 12 and the only current that will flow in coil 12 will be the relatively small current which is the magnetizing current for the particular transformer. This current, as mentioned, is small and furthermore, is substantially in quadrature with the applied voltage so that conditions for actuation of motor 16 are not established.

However, if switch S2 is closed, the impedance across coil 14 will drop to substantially zero and the impedance reflected to coil 12 will be substantially zero and the current in coil 12 will rise to a value sufficient to actuate motor 16.

When motor 16 commences to rotate, cam 18 will close switch S1 and bypass coil 12. Motor 16 will now continue to run, even if switch S2 is opened, until cam 18 again opens switch S1. Thus, a momentary closing of switch S2 in the lower voltage control circuit will control the actuation of the load (motor 16) associated with the higher voltage load circuit.

It will be appreciated that a certain minimum current is required in coil 12 to actuate the load and any impedance connected across the terminals of coil 14 large enough to keep the load current below that minimum will prevent actuation of the load. Accordingly, a certain minimum impedance is required across the terminals of coil 14 to prevent the current in coil 12 from rising to above the minimum required to actuate the load while a certain reduction in the impedance across the terminals of coil 14 will permit the current in coil 12 to rise to load actuating valve. It will therefore be appreciated that switch S2 connected across the terminals of coil 14 represents only one type of variable impedance that could be employed for control purposes.

FIG. 1 also shows a diode D and a capacitor C connected across the terminals of coil 14, and a resistor R connected in parallel with capacitor C. A rectified source of voltage is established across resistor R while motor 16 is not operating and switch S2 is open which can be employed as a source of power for relay coils, such as coils K1 and K2. These relay coils are connected in parallel with resistor R with a respective switch S3, S4 in series with each relay coil for control thereof.

Figure 2:
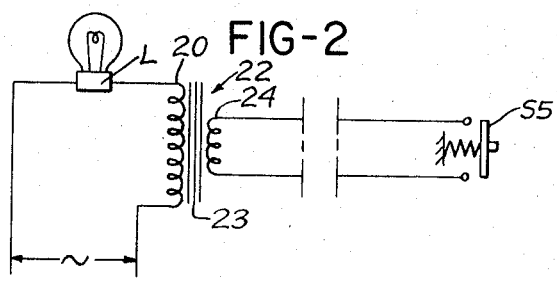
FIG. 2 is a schematic view showing the circuit modified to control a lamp.

In FIG. 2, lamp L is in series with primary coil 20 of transformer 22 which includes a magnetic frame 23 and which also has a secondary coil 24 of a lesser number of turns than coil 20. A variable impedance in the form of a switch S5 is connected across the terminals of coil 24.

When switch S5 is open, the small current in coil 20 will not illuminate lamp L but when switch S5 is closed, the current in coil 20 rises to the value required to illuminate lamp L. In the case of FIG. 2, lamp L represents the load and the actuation of the load occurs when the lamp is illuminated. It will be noted that if the supply voltage is line voltage of 120 volts and lamp L is a conventional lamp, the circuit of FIG. 2 has the merit of protecting the lamp from the full line voltage and the lamp will have longer than average life. Furthermore, the lamp will not experience the initial high surge of current that occurs when a cold lamp is connected directly across a line by closing a switch and, for this reason also will have longer life than average.

Figure 3:
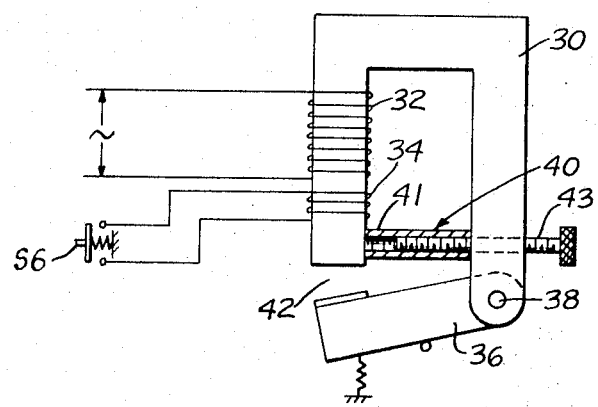
FIG. 3 shows, schematically, a modification of the invention which embodies a movable magnetic member.

In FIG. 3, the magnetic frame on which the coils are mounted and which magnetically couples the coils is indicated at 30. This frame may be the frame of a solenoid or a relay having an airgap in its magnetic path and an armature in the airgap in the form of a reciprocable plunger, or a pivotal armature. In either case, the armature has a first, nonactuated, position when frame 30 is only slightly magnetized and a second, actuated, position when frame 30 is highly magnetized. When the armature is in its first position, the frame has a longer airgap in its magnetic path and when the armature is in its second position, the airgap is shorter.

In FIG. 3, 32 is the coil with the higher number of turns and is connected to the source of voltage. The control coil 34 is magnetically coupled to coil 32 by frame 30 and has a fewer number of turns and has switch S6 connected across its terminals.

Armature 36 in FIG. 3 is normally in the position shown but will pivot upwardly about pivot 38 when frame 30 is highly magnetized.

A magnetic shunt 40 of relatively small cross section is arranged in bypassing relation to airgap 42. This shunt permits sufficient flux to flow in a closed path about the frame to couple coils 32 and 34 together effectively so that when switch S6 is open, the current in coil 32 will not lift armature 36 whereas, when switch S6 is closed, the current in coil 32 will rise to a value that will actuate armature 36.

In FIG. 3, the load which is sensitive to the current flow in coil 32 is armature 36 and, as in the other modifications, actuation of the load occurs only when the current in coil 32 rises to a certain minimum valve. The armature 36, or a reciprocable armature when the magnetic frame is that of a solenoid, can actuate contacts to and from closed position, or move other movable members such as valve members, or the like.

Figure 4:
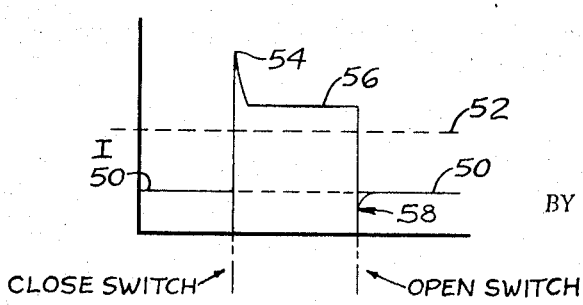
FIG. 4 is a graph showing the load current in the circuit of FIG. 3 under different operative conditions.

FIG. 4 shows, schematically, how the current varies in coil 32. When switch S6 is open, the current in coil 32 is at the value indicated by line 50. The current necessary to actuate the armature is the value indicated by dashed line 52. Thus, with switch S6 open, armature 36 remains in its nonactuated position and the current flow in coil 32 is merely the small magnetizing current for frame 30.

When switch S6 is closed, the current in coil 32 rises to a peak value indicated at point 54. This value is greater than that required to actuate the armature and the armature will, therefore, be moved to its second, actuated position.

Movement of the armature to its actuated position will shorten the air gap of the frame and the current in coil 32 will drop to the value indicated by line 56. This value is greater than that of line 52 so the armature will stay in actuated position until switch S6 is opened whereupon the current will drop to a minimum value indicated by point 58 due to the actuated position of the armature, and the armature will then drop back to its first position and the current in coil 32 will rise from point 58 to the magnetizing value indicated by line 50.

The distance of line 50 of the graph of FIG. 4 from line 52 and, therefore, the sensitivity of the control system, can be adjusted by adjusting the reluctance of shunt 40. In FIG. 3, the shunt 40 comprises magnetic tube 41 and magnetic screw 43 threaded therein. The magnetizing current can be increased by retracting screw 43 toward the right to increase the reluctance of the shunt, or it can be decreased by advancing screw 43 toward the left to decrease the reluctance of the shunt.

It will be appreciated that only a few selected examples have been illustrated wherein a first coil in a higher voltage load circuit is magnetically coupled to a second coil in a lower voltage control circuit and other particular examples falling within the scope of the appended claims will occur to those skilled in the art.

I claim:

1. In an electric circuit arrangement having a higher voltage load circuit and a lower voltage control circuit: first and second coils each having terminals, a magnetic frame magnetically coupling said coils, a load connected in series with said first coil and actuated in response to a predetermined minimum current flow in said first coil, a source of alternating current connected across the series combination of said load and said first coil, no make and brake contacts being necessary in the load circuit to actuate the load, the impedance of said first coil when said second coil has at least a predetermined minimum impedance connected across the terminals thereof being of such value that less than said predetermined minimum current flows in said first coil, and means for actuating said load by diminishing the impedance across said second coil terminals, said means comprising variable impedance means connected across the terminals of said second coil, and means for varying the impedance of said variable impedance means from at least said predetermined minimum impedance downwardly to cause said secondary coil to reflect a reduced impedance to said first coil and cause the current therein to rise above said predetermined minimum current and thereby effect actuation of said load.

2. An electric circuit according to claim 1 wherein said magnetic frame is the core of a transformer on which said first coil is wound as a primary coil and on which said secondary coil is wound as a secondary coil, said load being in series with said primary coil, and wherein said variable impedance means is a normally open switch and said means for varying said variable impedance means comprises means for closing said switch.

3. An electric circuit according to claim 2 in which said load is an electric motor, and a second switch is connected in parallel with said primary coil so as to shunt out said primary coil when closed, means responsive to operation of said motor for closing said second switch, and means also responsive to operation of said motor for subsequently opening said second switch.

4. An electric circuit according to claim 2 in which said load is in the form of a lamp.